(12) United States Patent
To et al.

(10) Patent No.: US 10,512,361 B2
(45) Date of Patent: Dec. 24, 2019

(54) GRILLING OVEN

(71) Applicant: Universal Electrical Machine Works (Huizhou) Co., Ltd., Huizhou, Guangdong (CN)

(72) Inventors: Kayeung To, Guangdong (CN); Kafai To, Guangdong (CN)

(73) Assignee: Universal Electrical Machine Works (Huizhou) Co., Ltd., Huizhou (CN)

( * ) Notice: Subject to any disclaimer, the term of this patent is extended or adjusted under 35 U.S.C. 154(b) by 559 days.

(21) Appl. No.: 15/256,805

(22) Filed: Sep. 6, 2016

(65) Prior Publication Data

US 2017/0065126 A1 Mar. 9, 2017

(30) Foreign Application Priority Data

Sep. 7, 2015 (CN) .................. 2015 2 0690632 U

(51) Int. Cl.
*A47J 37/07* (2006.01)
*A47J 37/06* (2006.01)

(52) U.S. Cl.
CPC ....... *A47J 37/0786* (2013.01); *A47J 37/0676* (2013.01); *A47J 37/0709* (2013.01); *A47J 37/0736* (2013.01)

(58) Field of Classification Search
CPC ............... A47J 37/0786; A47J 37/0676; A47J 37/0709; A47J 37/0736; H05B 1/02; H05B 6/6408; H05B 6/705; H05B 6/725
USPC .......................................................... 99/331
See application file for complete search history.

(56) References Cited

U.S. PATENT DOCUMENTS

| | | | | |
|---|---|---|---|---|
| 4,562,771 A | * | 1/1986 | Williams | A47J 37/041 126/338 |
| 4,951,558 A | * | 8/1990 | Figliuzzi | A47J 36/165 99/336 |
| 5,884,554 A | * | 3/1999 | Sprick | A47J 37/041 126/25 A |
| 6,936,795 B1 | * | 8/2005 | Moon | A47J 37/0623 126/21 A |
| 2004/0035845 A1 | * | 2/2004 | Moon | A47J 37/0623 219/400 |
| 2006/0278210 A1 | * | 12/2006 | Wang | A47J 37/0635 126/25 R |
| 2007/0240698 A1 | * | 10/2007 | Holbrook | A47J 37/0786 126/25 R |
| 2009/0104329 A1 | * | 4/2009 | Bally | F24C 7/06 426/523 |

(Continued)

*Primary Examiner* — Brian W Jennison

(57) ABSTRACT

The present invention discloses a grilling oven comprising an oven body and a grilling chamber encircled by the oven body; an electrical heating device, a grilling grid and a fat catching plate are provided in the grilling chamber; the electrical heating device is located at the top of the grilling chamber; the fat catching plate is located at the bottom of the grilling chamber; the grilling grid is located between the electrical heating device and the fat catching plate; the grilling grid and the fat catching plate both are horizontally placed. During a grilling process, the fat of grilled meat is prevented from dripping downwards onto a heat source of the grilling oven, so that no cancerogenic substance is produced thereby or condensed on the grilled meat, thus making the grilling process more environmental and healthy, and the grilled meat safe to eat.

3 Claims, 6 Drawing Sheets

(56) References Cited

U.S. PATENT DOCUMENTS

| | | | | |
|---|---|---|---|---|
| 2009/0206071 A1* | 8/2009 | Mori | ............ | H05B 6/6408 |
| | | | | 219/690 |
| 2011/0011278 A1* | 1/2011 | Jones | ............ | A47J 37/1219 |
| | | | | 99/406 |
| 2012/0204732 A1* | 8/2012 | Dondurur | ............ | A47J 37/041 |
| | | | | 99/427 |
| 2013/0055906 A1* | 3/2013 | Kanbur | ............ | A47J 37/0623 |
| | | | | 99/419 |
| 2014/0021191 A1* | 1/2014 | Moon | ............ | F24C 7/088 |
| | | | | 219/392 |
| 2014/0299000 A1* | 10/2014 | Hanneson | ............ | A47J 31/46 |
| | | | | 99/300 |
| 2014/0311355 A1* | 10/2014 | Hegarty | ............ | A21B 1/40 |
| | | | | 99/331 |

* cited by examiner

GRILLING OVEN

CROSS-REFERENCE TO PRIOR APPLICATION

This application claims the benefit of Chinese Utility Model Application No. 201520690632.5 filed on Sep. 7, 2015, the contents of which are incorporated herein by reference.

FIELD OF THE INVENTION

The present invention relates to a grilling oven.

BACKGROUND OF THE INVENTION

In daily life people often eat grilled food, like grilled pork, roast pork, grilled duck, grilled lamb chop, etc., among which grilled pork is favored by diners for its crispy skin and great taste. In existing grilling ovens, meat is usually grilled by the heat produced from blistering charcoal placed in an iron box, or by the heat produced from fuel gas or electrical heating elements. During grilling, fat from the meat will drip downwards onto the heat source of the existing grilling ovens. As a result, fumes that develop from fat dripping on the heat source (such as the blistering charcoal) are rich in benzopyrene, which can condense on grilled meat. People may be easy to get cancer if they eat too much of this kind of grilled meat, so westerners regard this grilled meat as highly carcinogenic food and criticize it. Besides, the existing grilling oven requires a power of 60 to 80 kilowatt. Moreover, in the kitchen, it is harmful to inhale the fumes that are rich in benzopyrene.

SUMMARY OF THE INVENTION

This invention aims to provide a grilling oven, which during grilling process prevents the fat of grilled meat from dripping downwards onto a heat source of the grilling oven, so that no cancerogenic substance is produced thereby or condensed on the grilled meat, thus making the grilling process more environmental and healthy, and the grilled meat safe to eat.

In order to solve the technical problems above, the present invention provides a grilling oven comprising an oven body and a grilling chamber encircled by the oven body; an electrical heating device, a grilling grid and a fat catching plate are provided in the grilling chamber; the electrical heating device is located at the top of the grilling chamber; the fat catching plate is located at the bottom of the grilling chamber; the grilling grid is located between the electrical heating device and the fat catching plate; the grilling grid and the fat catching plate both are horizontally placed.

Preferably, a heat insulation layer is provided inside the oven body. By means of the heat insulation layer, heat inside the grilling chamber is prevented from escaping and thus the heating efficiency of the grilling oven is improved. Meanwhile chefs will be protected from getting burned when using the grilling oven.

Preferably, the grilling oven further comprises a fume exhauster; the fume exhauster is placed on the oven body; at least one gas passage is arranged inside the heat insulation layer; one end of the gas passage is communicated with the grilling chamber, the other end of the gas passage is communicated with the fume exhauster. Fumes produced during grilling process are sucked away from the grilling chamber by the fume exhauster, thus making the grilling process more environmental.

Preferably, the grilling chamber has a plurality of grooves at different heights, the grilling grid is fitted into the grooves. Chefs may choose to place the grilling grid at a certain height from said different heights according to the thickness and type of meat.

Preferably, a raising and lowering device is provided inside the oven body; the raising and lowering device is fixedly connected with the grilling grid.

In one embodiment, the raising and lowering device comprises a first motor, a screw rod and a screw nut; the screw rod is perpendicular to the grilling grid; the screw nut embraces the screw rod and is connected with the screw rod via a thread; the screw nut is fixedly connected with the grilling grid; a motor shaft of the first motor is placed in parallel with the screw rod and is fixedly connected with the screw rod. The first motor drives the rotation of the screw rod so as to enable the screw nut to move up and down, thus the height of the grilling grid is adjusted.

In another embodiment, the grilling grid comprises a two-layer structure consisting of an upper grilling grid and a lower grilling grid; the raising and lowering device comprises a first motor, a second motor, a screw rod and a screw nut; the screw rod is perpendicular to the grilling grid; the screw nut embraces the screw rod and is connected with the screw rod via a thread; a motor shaft of the first motor is placed in parallel with the screw rod and is fixedly connected with the screw rod; the second motor is fixed to the screw nut; a motor shaft of the second motor is placed in parallel with the grilling grid, and the motor shaft of the second motor is fixedly connected with the upper grilling grid and the lower grilling grid via a connector. The first motor drives the rotation of the screw rod so as to enable the screw nut to move up and down, thus the height of the grilling grid is adjusted. Meat to be grilled is sandwiched between the upper grilling grid and the lower grilling grid. After one side of the meat has been sufficiently grilled, the second motor enables the grilling grid to be turned over, such that the other side of the meat can be grilled. Therefore, a user may adjust the height of the grilling grid or turn over the grilling grid according to his need.

Preferably, the grilling oven further comprises a control unit, the control unit is electrically connected with the first motor, the second motor and the electrical heating device.

Preferably, the fat catching plate comprises a base plate and a filter board covering the base plate; the filter board has a plurality of filtration holes. Therefore, the fat of grilled meat will drop into the base plate through the filtration holes of the filter board. In this way, the fat is not exposed and not easy to get burned.

Preferably, the filtration hole is funnel-shaped.

Compared with prior arts, the grilling oven of the present invention has beneficial effects as follows. The electrical heating device is located at the top of the grilling chamber, while the grilling grid is located under the electrical heating device, thus during a grilling process, fat of the meat placed on the grilling grid is prevented from dripping onto the electrical heating device and no cancerogenic substance is produced thereby. Rather, fat of the grilled meat is collected into the fat catching plate, which makes the whole grilling process more environmental. Moreover, as electrical heating device is employed for heating, the deficiency like heating instability via open fire is avoided. Therefore, the employment of the grilling oven according to the present invention may during grilling process prevents the fat of grilled meat from dripping downwards onto a heat source of the grilling oven, so that no cancerogenic substance is produced thereby or condensed on the grilled meat, thus making the grilling process more environmental and healthy, and the grilled meat safe to eat.

DETAILED DESCRIPTION OF ILLUSTRATED EMBODIMENTS

Technical solutions in the present invention are described clearly and completely below in conjunction with figures of the embodiments. Obviously, the embodiments described are only part of, rather than all embodiments of the present invention. Based on embodiments in the present invention, any other embodiment without creative work achieved by the skilled in the art shall be deemed as within the scope of the present invention.

Figure 1:
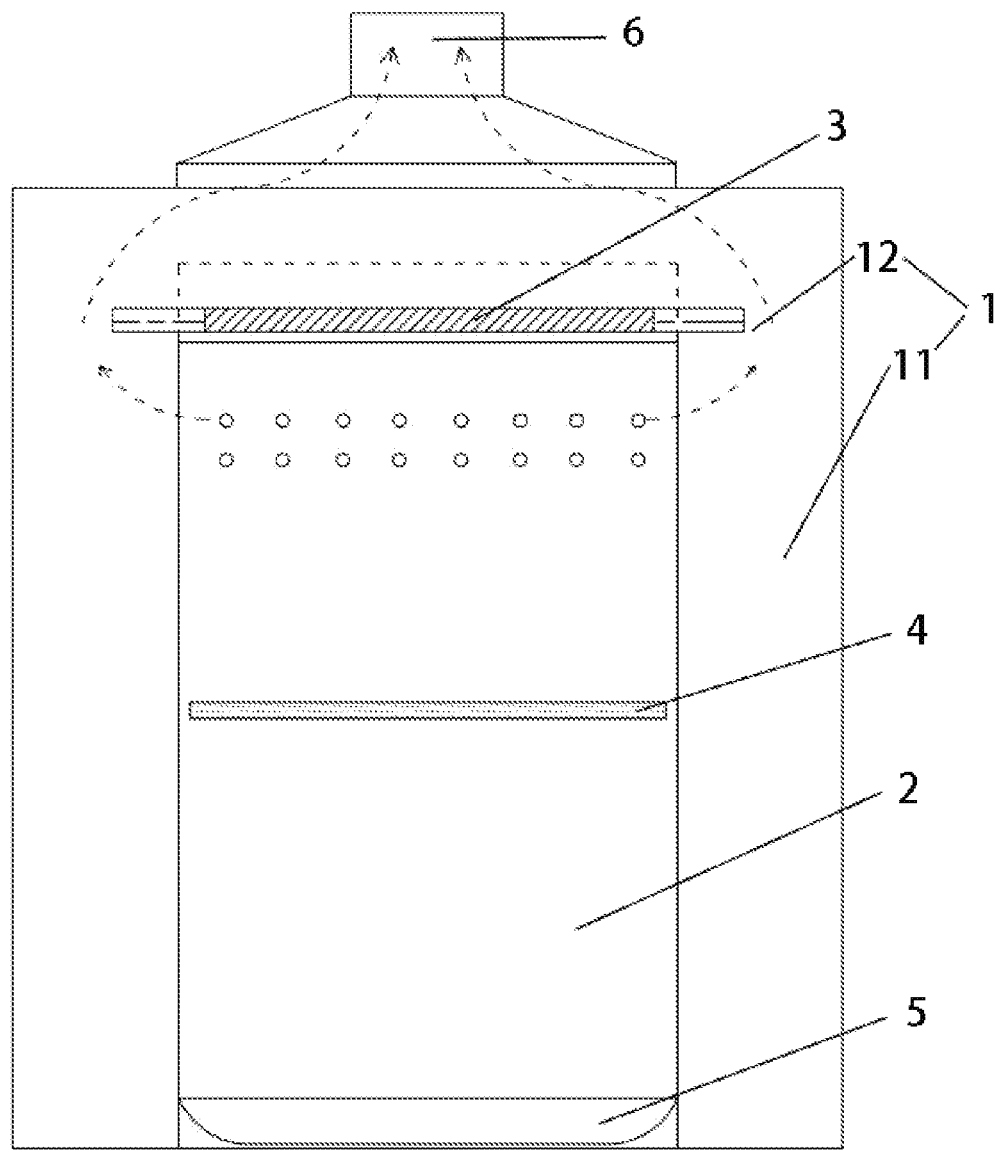
FIG. 1 is a schematic view showing a grilling oven according to a first embodiment of the present invention.

Referring to FIG. 1, there is depicted a schematic view showing a grilling oven according to the first embodiment of the present invention. The grilling oven comprises an oven body 1 and a grilling chamber 2 encircled by the oven body 1. An electrical heating device 3, a grilling grid 4 and a fat catching plate 5 are provided in the grilling chamber 2. The electrical heating device 3 is located at the top of the grilling chamber 2. The fat catching plate 5 is located at the bottom of the grilling chamber 2. The grilling grid 4 is located between the electrical heating device 3 and the fat catching plate 5. The grilling grid 4 and the fat catching plate 5 both are horizontally placed.

Preferably, a heat insulation layer 11 is provided inside the oven body 1. By means of the heat insulation layer 11, heat inside the grilling chamber 2 is prevented from escaping and thus the heating efficiency of the grilling oven is improved. Meanwhile chefs will be protected from getting burned when using the grilling oven.

Preferably, the grilling oven further comprises a fume exhauster 6. The fume exhauster 6 is placed on the oven body 1. At least one gas passage 12 is arranged inside the heat insulation layer 11. One end of the gas passage 12 is communicated with the grilling chamber 2, the other end of the gas passage 12 is communicated with the fume exhauster 6. Fumes produced during grilling process are sucked away from the grilling chamber 2 by the fume exhauster 6, thus making the grilling process more environmental.

Figure 2:
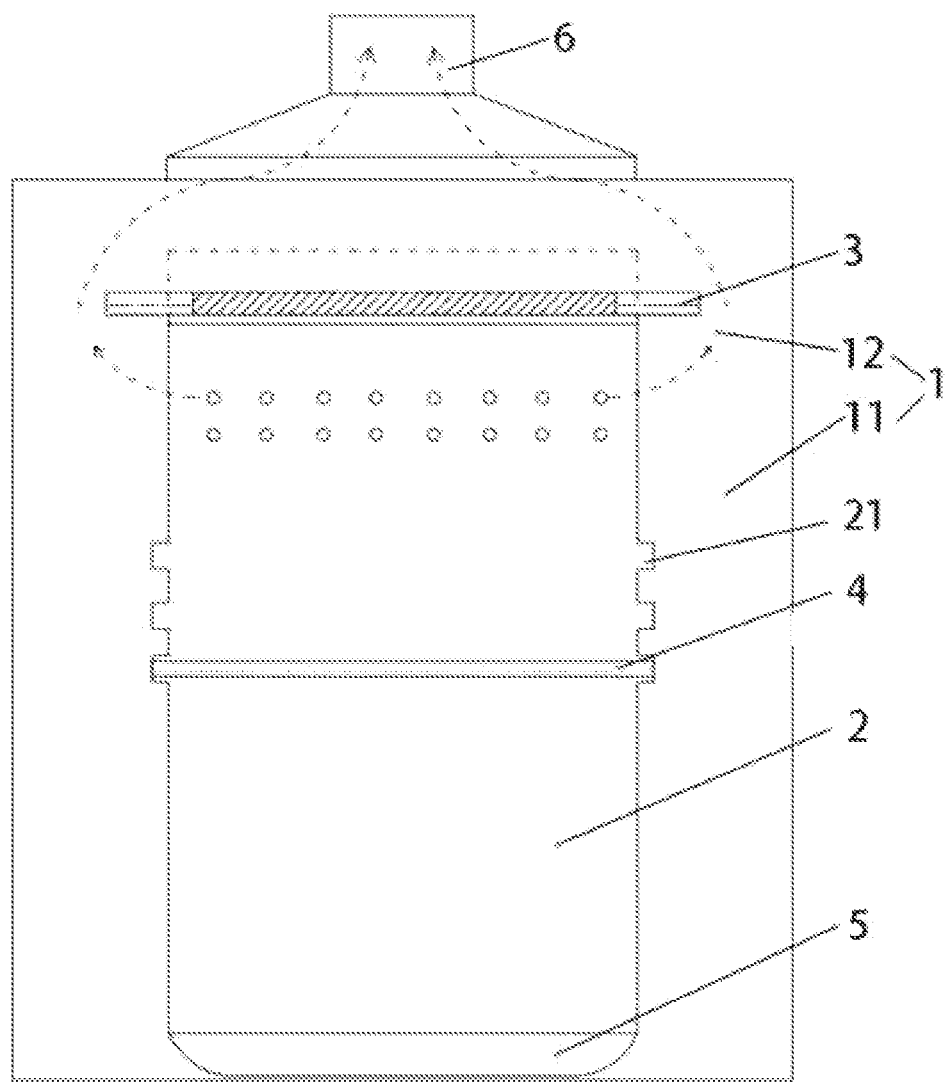
FIG. 2 is a schematic view showing a grilling oven according to a second embodiment of the present invention.

Referring to FIG. 2, there is depicted a schematic view showing a grilling oven according to the second embodiment of the present invention. This embodiment further limits the grilling oven of the first embodiment. The grilling chamber 2 has a plurality of grooves 21 at different heights. The grilling grid 4 is fitted into the grooves 21. Chefs may choose to place the grilling grid 4 at a certain height from said different heights according to the thickness and type of meat.

Figure 3:
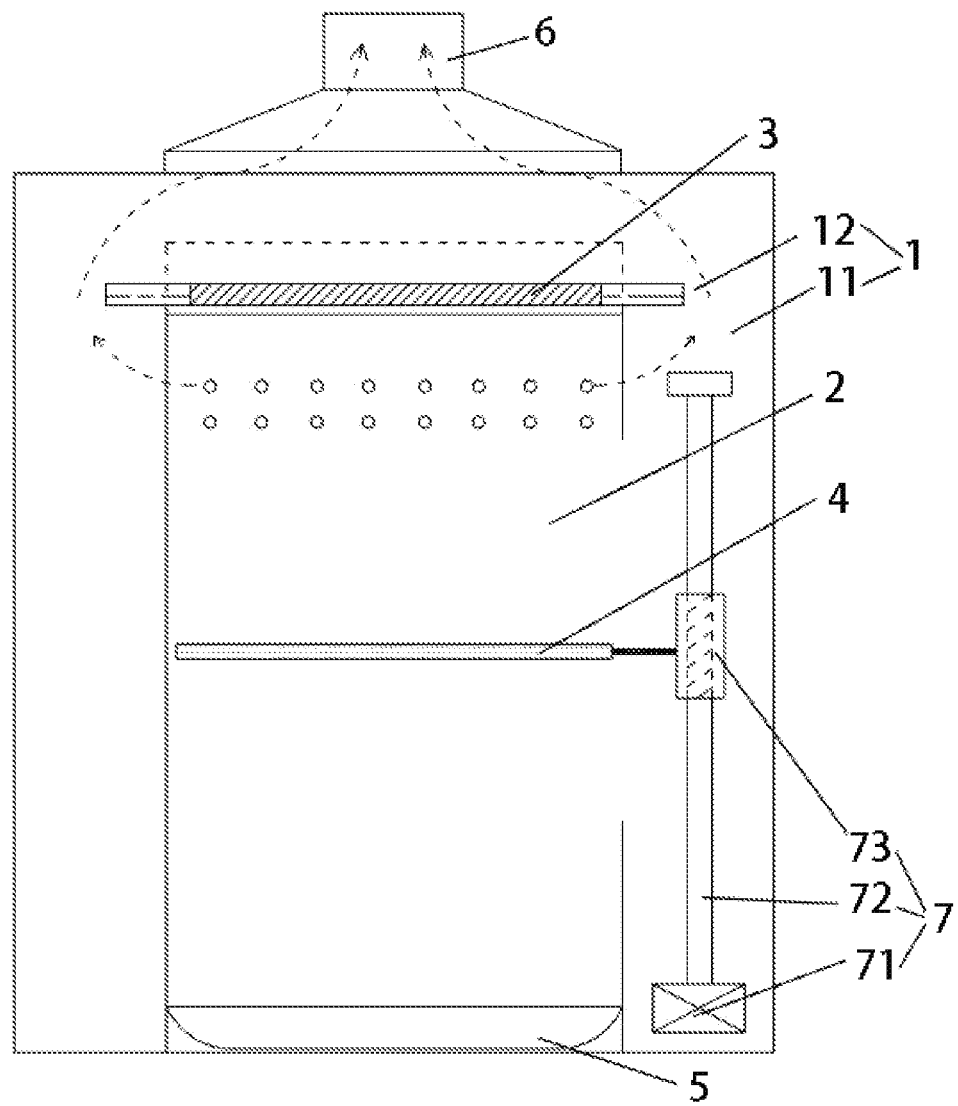
FIG. 3 is a schematic view showing a grilling oven according to a third embodiment of the present invention.

Referring to FIG. 3, there is depicted a schematic view showing a grilling oven according to the third embodiment of the present invention. This embodiment further limits the grilling oven of the first embodiment. A raising and lowering device 7 is provided inside the oven body 1. The raising and lowering device 7 is fixedly connected with the grilling grid 4.

The raising and lowering device 7 comprises a first motor 71, a screw rod 72 and a screw nut 73. The screw rod 72 is perpendicular to the grilling grid 4. The screw nut 73 embraces the screw rod 72 and is connected with the screw rod 72 via a thread. The screw nut 73 is fixedly connected with the grilling grid 4. A motor shaft of the first motor 71 is placed in parallel with the screw rod 72 and is fixedly connected with the screw rod 72. The first motor 71 drives the rotation of the screw rod 72 so as to enable the screw nut 73 to move up and down, thus the height of the grilling grid 4 is adjusted.

Figure 4:
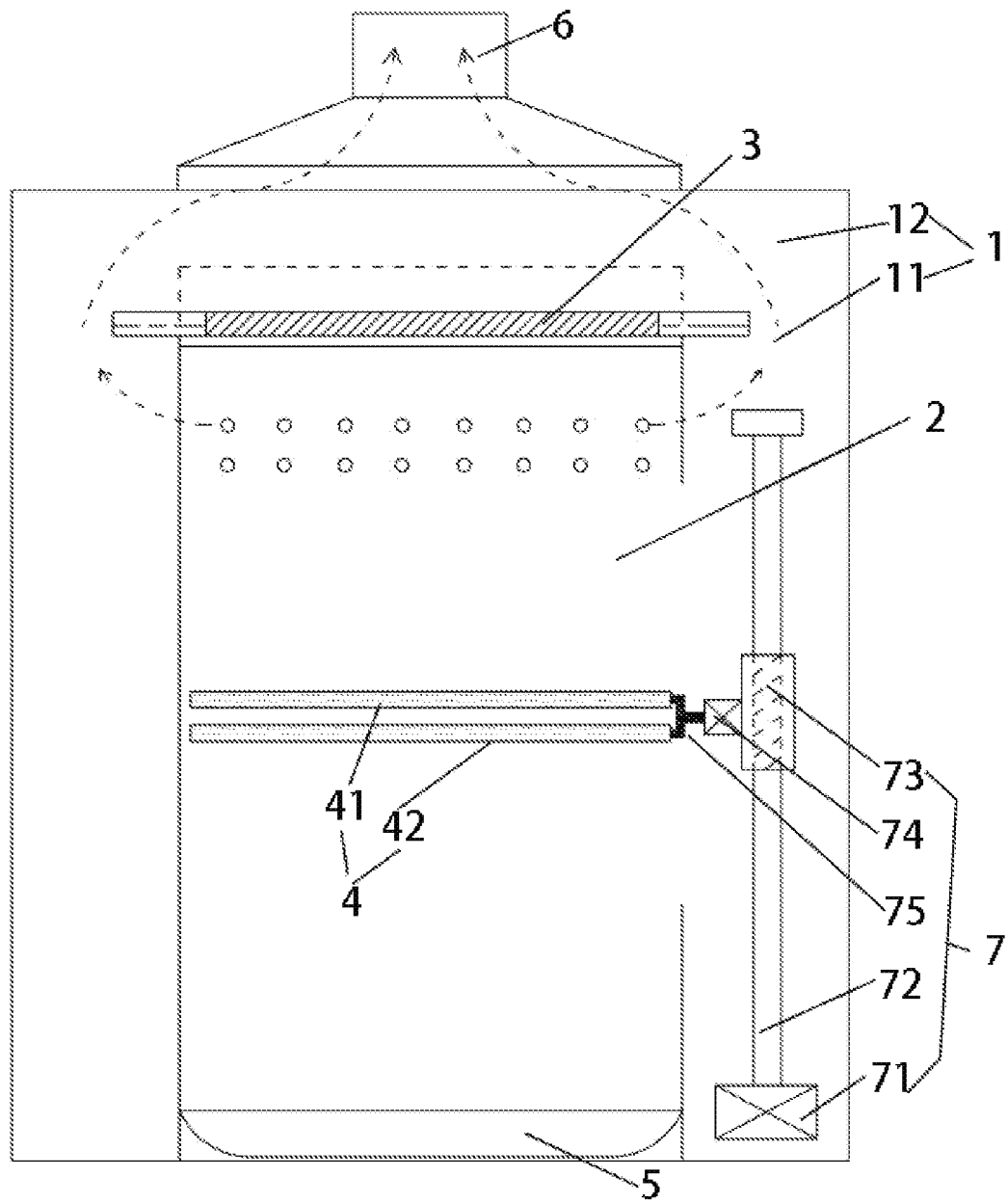
FIG. 4 is a schematic view showing a grilling oven according to a fourth embodiment of the present invention.

Referring to FIG. 4, there is depicted a schematic view showing a grilling oven according to the fourth embodiment of the present invention. This embodiment further limits the grilling oven of the first embodiment. A raising and lowering device 7 is provided inside the oven body 1. The raising and lowering device 7 is fixedly connected with the grilling grid 4.

The grilling grid 4 comprises a two-layer structure consisting of an upper grilling grid 41 and a lower grilling grid 42. The raising and lowering device 7 comprises a first motor 71, a second motor 74, a screw rod 72 and a screw nut 73. The screw rod 72 is perpendicular to the grilling grid 4. The screw nut 73 embraces the screw rod 72 and is connected with the screw rod 72 via a thread. A motor shaft of the first motor 71 is placed in parallel with the screw rod 72 and is fixedly connected with the screw rod 72. The second motor 74 is fixed to the screw nut 73. A motor shaft of the second motor 74 is placed in parallel with the grilling grid 4, and the motor shaft of the second motor 74 is fixedly connected with the upper grilling grid 41 and the lower grilling grid 42 via a connector 75. The first motor 71 drives the rotation of the screw rod 72 so as to enable the screw nut 73 to move up and down, thus the height of the grilling grid 4 is adjusted. Meat to be grilled is sandwiched between the upper grilling grid 41 and the lower grilling grid 42. After one side of the meat has been sufficiently grilled, the second motor 74 enables the grilling grid 4 to be turned over, such that the other side of the meat can be grilled. Therefore, a user may adjust the height of the grilling grid 4 or turn over the grilling grid 4 according to his need.

Preferably, the grilling oven further comprises a control unit. The control unit is electrically connected with the first motor 71, the second motor 74 and the electrical heating device 3. By means of the control unit, only by choosing requirements for grilling effects and physical parameters of the meat, the grilling process may be automatically completed. During the grilling process, the meat is firstly automatically raised to a height at a proper distance under the electrical heating device 3, when the meat is appropriately grilled for a certain time period, the grilling grid 4 is lowered automatically and the meat is turned over, then the grilling grid 4 is raised again to grill the other side of the meat. Once the whole grilling process is completed, the grilling grid 4 may be lowered again.

Figure 5:
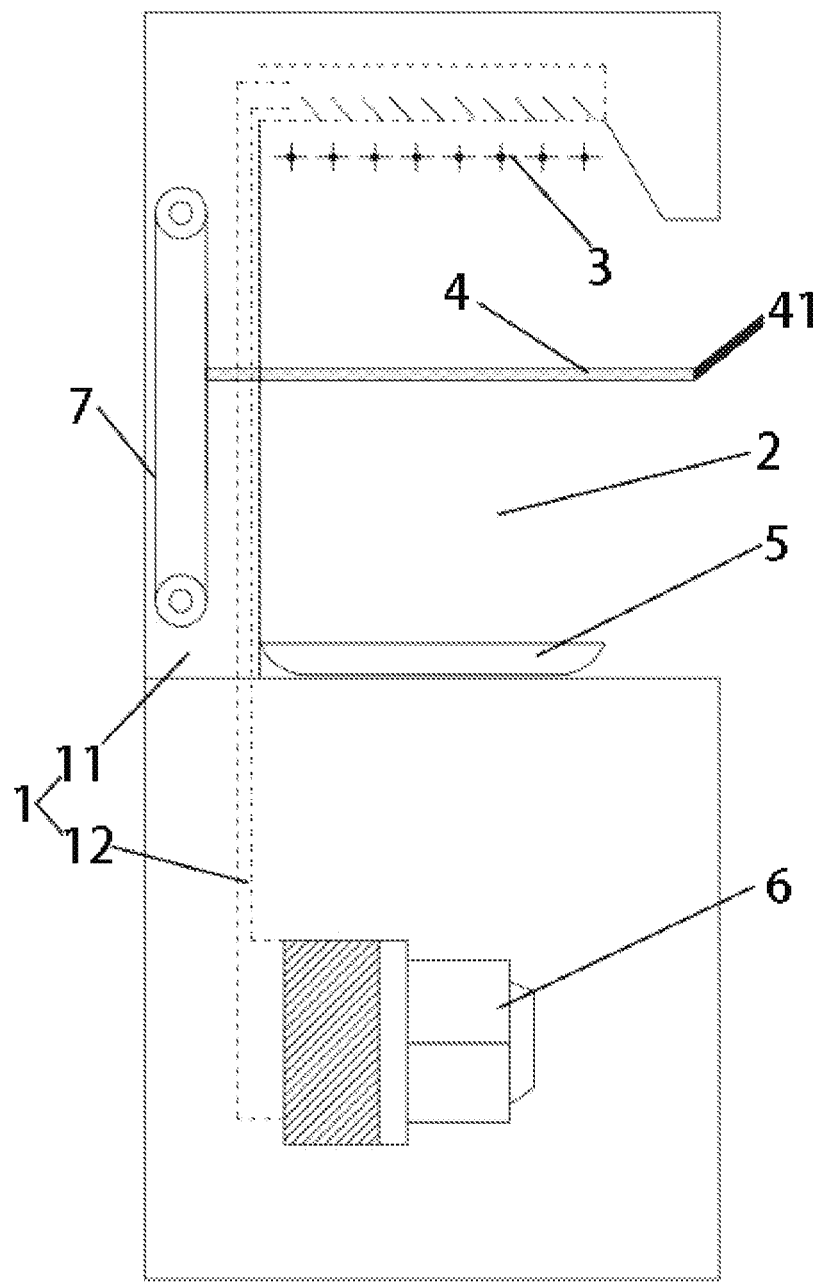
FIG. 5 is a schematic view showing a grilling oven according to a fifth embodiment of the present invention.

Referring to FIG. 5, there is depicted a schematic view showing a grilling oven according to the fifth embodiment of the present invention. This embodiment further limits the grilling oven of the first embodiment. The grilling oven further comprises a fume exhauster 6. The fume exhauster 6 is arranged inside the oven body 1 and under the fat catching plate 5. A heat insulation layer 11 is provided inside the oven body 1. A gas passage 12 is provided inside the heat insulation layer 11. One end of the gas passage 12 is communicated with the grilling chamber 2 and is located above the electrical heating device 3, the other end of the gas passage 12 is communicated with the fume exhauster 6.

A raising and lowering device 7 is provided inside the oven body 1. The raising and lowering device 7 comprises a conveyor belt capable of moving up and down. The conveyor belt is fixedly connected with one end of the grilling grid 4, the other end of the grilling grid 4 is provided with a handle 41.

Figure 6:
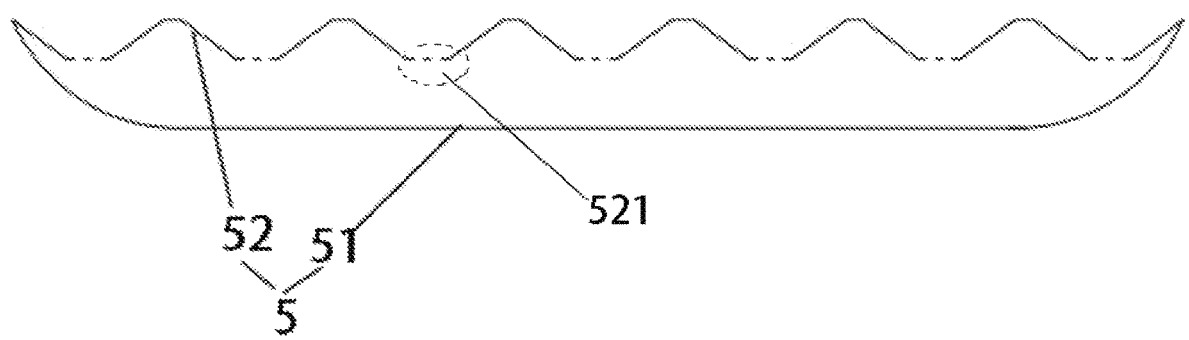
FIG. 6 is a cross-sectional view showing a fat catching plate of the grilling oven according to any of FIGS. 1-5.

Referring to FIG. 6, preferably, the fat catching plate 5 comprises a base plate 51 and a filter board 52 covering the base plate 51. The filter board 52 has a plurality of filtration holes 521. Therefore, the fat of grilled meat will drop into the base plate 51 through the filtration holes 521 of the filter board 52. In this way, the fat is not exposed and not easy to get burned. Referring to FIG. 6, there is depicted a cross-sectional view showing the fat catching plate 5 of the grilling oven according to any of FIGS. 1-5.

More preferably, the filtration hole 521 is funnel-shaped.

More preferably, the electrical heating device is consisted of a plurality of heating tubes, which are capable of generating a high temperature of 800□, thus achieving the best grilling effects.

Compared with prior arts, the grilling oven of the present invention has beneficial effects as follows. The electrical heating device 3 is located at the top of the grilling chamber 2, while the grilling grid 4 is located under the electrical heating device 3, thus during a grilling process, fat of the meat placed on the grilling grid 4 is prevented from dripping onto the electrical heating device 3 and no cancerogenic substance is produced thereby. Rather, fat of the grilled meat is collected into the fat catching plate 5, which makes the whole grilling process more environmental. Moreover, as electrical heating device is employed for heating, the deficiency like heating instability via open fire is avoided. Therefore, the employment of the grilling oven according to the present invention may during grilling process prevents the fat of grilled meat from dripping downwards onto a heat source of the grilling oven, so that no cancerogenic substance is produced thereby or condensed on the grilled meat, thus making the grilling process more environmental and healthy, and the grilled meat safe to eat.

All the above are merely preferred embodiments of the present invention. It shall be noted that the present invention is intended to cover various improvements and modifications included within the principle of the present invention, if any of which is made by the skilled in the art.

What is claimed is:

1. A grilling oven, characterized in that the grilling oven comprises an oven body and a grilling chamber encircled by the oven body;
   an electrical heating device, a grilling grid and a fat catching plate are provided in the grilling chamber;
   the electrical heating device is located at the top of the grilling chamber;
   the fat catching plate is located at the bottom of the grilling chamber;
   the grilling grid is located between the electrical heating device and the fat catching plate;
   the grilling grid and the fat catching plate both are horizontally placed;
   a heat insulation layer is provided inside the oven body;
   the grilling oven further comprises a fume exhauster;
   the fume exhauster is placed on the oven body to suck away fumes produced during a grilling process;
   at least one gas passage is arranged inside the heat insulation layer;
   one end of the gas passage is communicated with the grilling chamber, the other end of the gas passage is communicated with the fume exhauster;
   wherein a raising and lowering device is provided inside the oven body; the raising and lowering device is fixedly connected with the grilling grid;
   wherein the grilling grid comprises a two-layer structure consisting of an upper grilling grid and a lower grilling grid;
   the raising and lowering device comprises a first motor, a second motor, a screw rod and a screw nut;
   the screw rod is perpendicular to the grilling grid;
   the screw nut embraces the screw rod and is connected with the screw rod via a thread;
   a motor shaft of the first motor is placed in parallel with the screw rod and is fixedly connected with the screw rod;
   the second motor is fixed to the screw nut;
   a motor shaft of the second motor is placed in parallel with the grilling grid, and the motor shaft of the second motor is fixedly connected with the upper grilling grid and the lower grilling grid via a connector;
   wherein the grilling oven further comprises a control unit to automatically control the grilling process, the control unit is electrically connected with the first motor, the second motor and the electrical heating device.

2. The grilling oven according to claim 1, characterized in that the fat catching plate comprises a base plate and a filter board covering the base plate; the filter board has a plurality of filtration holes.

3. The grilling oven according to claim 2, characterized in that the filtration hole is funnel-shaped.

* * * * *